United States Patent
Koberstine et al.

(10) Patent No.: US 11,295,633 B2
(45) Date of Patent: Apr. 5, 2022

(54) LEVER SYSTEM AS A TEACHING TOOL

(71) Applicant: The Prophet Corporation, Owatonna, MN (US)

(72) Inventors: Jason Butler Koberstine, Apple Valley, MN (US); Alison Marie Harguth, Owatonna, MN (US)

(73) Assignee: THE PROPHET CORPORATION, Owatonna, MN (US)

( * ) Notice: Subject to any disclaimer, the term of this patent is extended or adjusted under 35 U.S.C. 154(b) by 370 days.

(21) Appl. No.: 16/384,325

(22) Filed: Apr. 15, 2019

(65) Prior Publication Data
US 2019/0318657 A1 Oct. 17, 2019

Related U.S. Application Data

(60) Provisional application No. 62/606,156, filed on Apr. 16, 2018.

(51) Int. Cl.
*G09B 23/02* (2006.01)
*G09B 23/06* (2006.01)

(52) U.S. Cl.
CPC .................................. *G09B 23/06* (2013.01)

(58) Field of Classification Search
CPC ......... G09B 23/00; G09B 23/02; G09B 23/06
USPC ......................................................... 434/194
See application file for complete search history.

(56) References Cited

U.S. PATENT DOCUMENTS

| | | | | | |
|---|---|---|---|---|---|
| 3,212,202 | A | * | 10/1965 | Heinichen | G09B 23/04 434/194 |
| 3,339,291 | A | * | 9/1967 | Ruchlis | G09B 23/10 434/302 |
| 3,424,455 | A | * | 1/1969 | Dunson | A63F 9/26 273/459 |
| 3,486,244 | A | * | 12/1969 | Horn | G09B 23/04 34/398 |
| 3,567,221 | A | * | 3/1971 | Stults | G09B 23/02 273/459 |
| 3,949,491 | A | * | 4/1976 | Harte | G09B 19/02 434/194 |
| 4,106,220 | A | * | 8/1978 | Hurd | G09B 19/02 177/190 |
| 4,589,664 | A | * | 5/1986 | Slimp, Jr. | A63F 9/26 273/258 |
| 4,713,009 | A | * | 12/1987 | Borenson | G09B 23/02 434/188 |
| 4,731,022 | A | * | 3/1988 | Garland | G09B 23/06 177/190 |
| 4,871,314 | A | * | 10/1989 | Shih | G09B 19/02 434/194 |
| 5,425,643 | A | * | 6/1995 | Strickland | G09B 19/02 434/194 |

(Continued)

OTHER PUBLICATIONS

STEM Supplies, Engineering Catalog; pp. 16, 17, and 20-23, admitted as prior art as Apr. 15, 2018.

*Primary Examiner* — Kurt Fernstrom
(74) *Attorney, Agent, or Firm* — Merchant & Gould P.C.

(57) ABSTRACT

A lever system teaching tool includes a frame and an elongate member that is releasably coupled to the frame. The elongate member defines a plurality of mounting stations along its length. The elongate member can be pivotally or rotatably coupled to the fulcrum of the frame at any of the mounting stations. The elongate member includes repositories at opposite ends of the elongate member. The repositories are sized and shaped to retain one or more incremental loads.

20 Claims, 11 Drawing Sheets

(56) References Cited

U.S. PATENT DOCUMENTS

| | | | | |
|---|---|---|---|---|
| D392,200 S | * | 3/1998 | Gibson | D10/90 |
| 5,927,989 A | * | 7/1999 | Kung | G09B 23/02 |
| | | | | 434/194 |
| 6,200,140 B1 | * | 3/2001 | Steane | G09B 19/02 |
| | | | | 434/188 |
| 8,591,234 B1 | * | 11/2013 | Ratcliffe | G09B 1/04 |
| | | | | 434/149 |
| 9,466,227 B2 | * | 10/2016 | Marcario | G09B 23/02 |

* cited by examiner

LEVER SYSTEM AS A TEACHING TOOL

CROSS REFERENCE TO RELATED APPLICATION

This application claims the benefit of U.S. Provisional Application No. 62/606,156, filed Apr. 16, 2018, and titled "Lever System as a Teaching Tool," the disclosure of which is hereby incorporated herein by reference.

BACKGROUND

Existing tools for teaching physics concepts to students tend to be sized for individual, table-top use. Certain types of teaching tools include constructions sets from which students build various machines or tools. For example, students may build simple tools and machines, such as scales, levers, pulleys, mechanical arms, ballistic devices, etc., from which the student can perform various experiments. However, the tools tend to be limited in what type of modifications can be made during the experiments.

Improvements are required.

SUMMARY

Aspects of the disclosure are directed to a teaching tool for use in teaching students about levers. The teaching tool includes a frame and an elongate member that is releasably coupled to the frame. The elongate member is pivotally or rotatably coupled to a fulcrum defined by the frame.

The elongate member extends along a length between a first end and a second end. The elongate member defines a plurality of mounting stations along the length of the elongate member. The elongate member can be coupled to the fulcrum of the frame at any of the mounting stations.

In certain implementations, the elongate member includes a first repository at which a load can be added to the elongate member. In certain examples, the first repository is disposed at a first end of the elongate member. In certain examples, the first repository is sized and shaped to retain one or more incremental loads (e.g., balls, stones, bean bags, or other weights).

In certain implementations, the elongate member includes a second repository at which a load can be added to the elongate member. In certain examples, the second repository is disposed at a second end of the elongate member opposite the first repository. In certain examples, the second repository is sized and shaped to retain one or more incremental loads (e.g., balls, stones, bean bags, or other weights).

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 4:
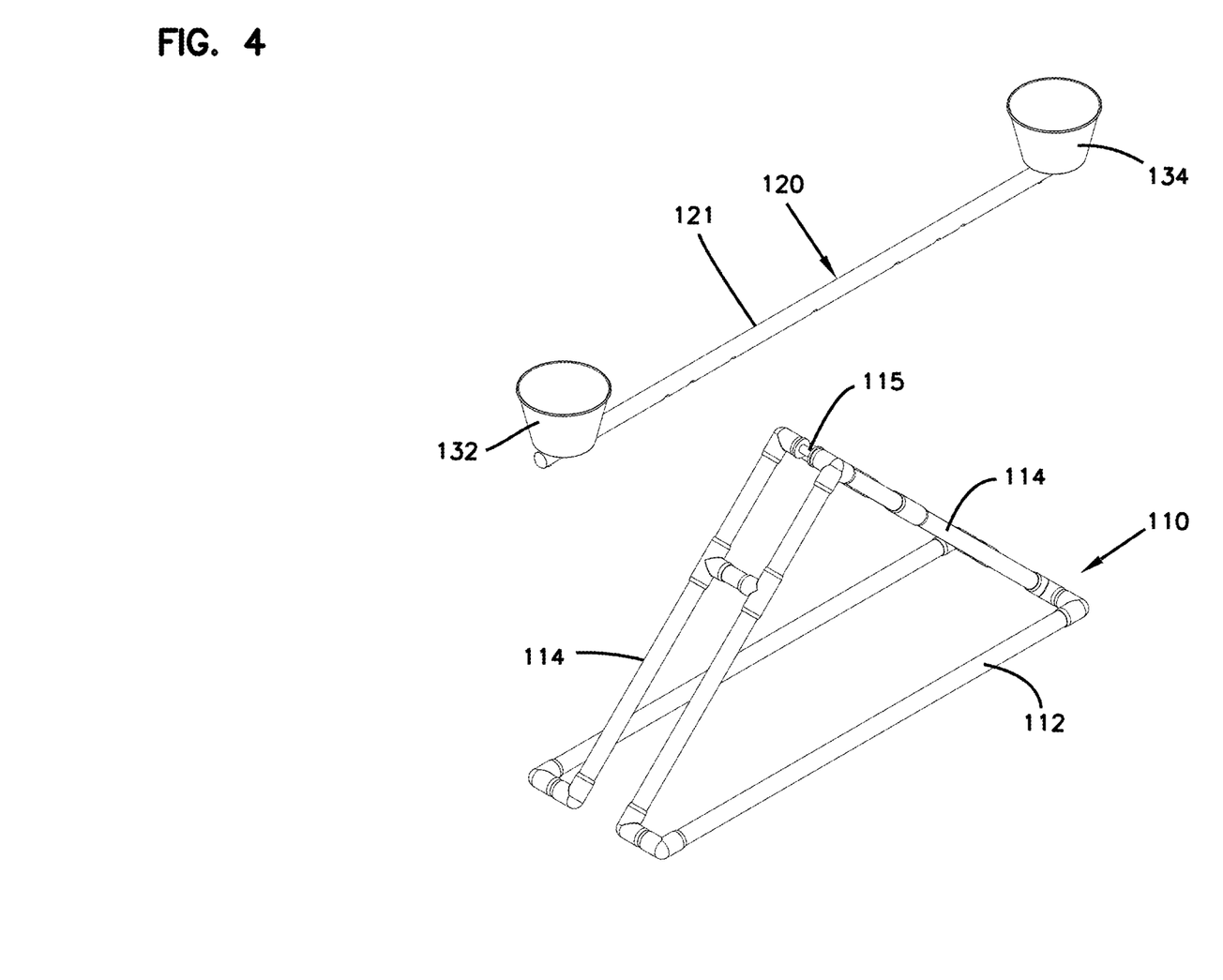
FIG. 4 is a top perspective view of the teaching system of FIG. 1 with the elongate member exploded away from the frame for ease in viewing the fulcrum.

Referring to the figures in general, the present disclosure is directed to a teaching tool 100 for use in teaching students about levers. The teaching tool 100 includes a frame 110 and an elongate member 120 that is releasably coupled to the frame 110. The elongate member 120 is pivotally or rotatably coupled to a fulcrum 115 (FIG. 4) defined by the frame 110.

Figure 3:
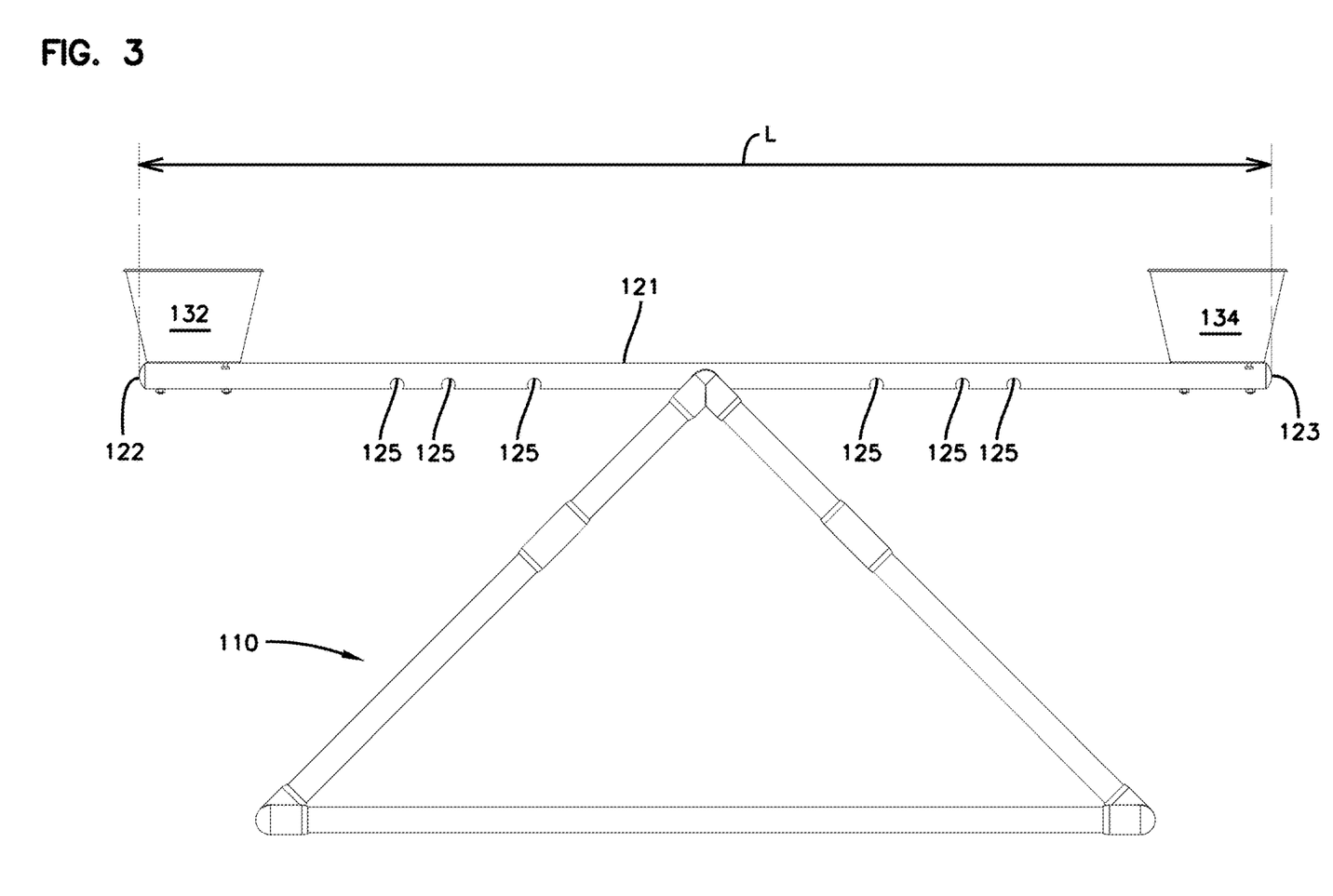
FIG. 3 is a first side elevational view of the teaching system of FIG. 1.

The elongate member 120 extends along a length L (FIG. 3) between a first end 122 and a second end 123. The elongate member 120 defines a plurality of mounting stations 125 along the length L of the elongate member 120. The elongate member 120 can be releasably coupled to the fulcrum 115 of the frame 110 at any of the mounting stations 125. In certain examples, the elongate member 120 snap-fits to the fulcrum 115 at the mounting stations.

In certain implementations, the teaching tool 100 is relatively lightweight and/or easy to assemble. In certain examples, the teaching tool 100 is formed from plastic. In certain examples, the teaching tool 100 is formed from plastic conduits or pipes interconnected by plastic joints. The conduits or pipes can be glued, fastened, friction-fit, or otherwise secured together via the joints.

In certain implementations, the teaching tool 100 is sized to be easily visible to multiple students during an experiment. For example, the teaching tool 100 may be sized to stand about waist-height for the students. In certain examples, the teaching tool 100 has a height between about 1 foot and about 4 feet. In certain examples, the teaching tool 100 has a height between about 1.5 feet and about 3 feet. In certain examples, the teaching tool 100 has a height of between 20 inches and thirty inches. In other examples, however, the teaching tool 100 can be any desired height. In certain examples, the teaching tool 100 has a length of between about 3 feet and about 7 feet. In certain examples, the teaching tool 100 has a length of between about 4 feet and about 6 feet. In certain examples, the teaching tool 100 has a length of between about 50 inches and about 60 inches. In other examples, however, the teaching tool 100 can be any desired length.

The frame 110 includes a bottom 101, a top 102, a first end 103, an opposite second end 104, a first side 105, and an opposite second side 106. In certain implementations, the frame 110 is symmetrical about a height of the frame 110 extending between the top and bottom 101, 102. In certain implementations, the frame 110 is symmetrical about a width of the frame 110 extending between the first and second sides 105, 106.

In certain implementations, the frame 110 includes a base 112 configured to support a remainder of the frame 110. In some examples, the base 112 is configured to seat on a surface (e.g., a floor, the ground, etc.). In other examples, the base 112 may include feet that seat on the surface. In certain examples, support members 114 extend upwardly from the base 112. In certain examples, the support members 114 extend towards each other to form a triangular shape. The fulcrum 115 is formed at an apex where the support members 114 meet.

In certain implementations, the frame 110 includes a first structure 116 coupled to a second structure 117 by one or more cross-members 118. Each of the first and second structures 116, 117 include a base 112 and two support members 114. In the example shown, the cross-members 118 extend along the width of the tool 100 between the support members 114. In certain examples, the fulcrum 115 is defined by a cross-member at the apex of the support members 114 (see FIG. 4). In certain examples, the cross-member forming the fulcrum 115 is narrower than the conduits forming the support members 114. In certain examples, the cross-member forming the fulcrum 115 is narrower than the other cross-members 118.

Figure 5:
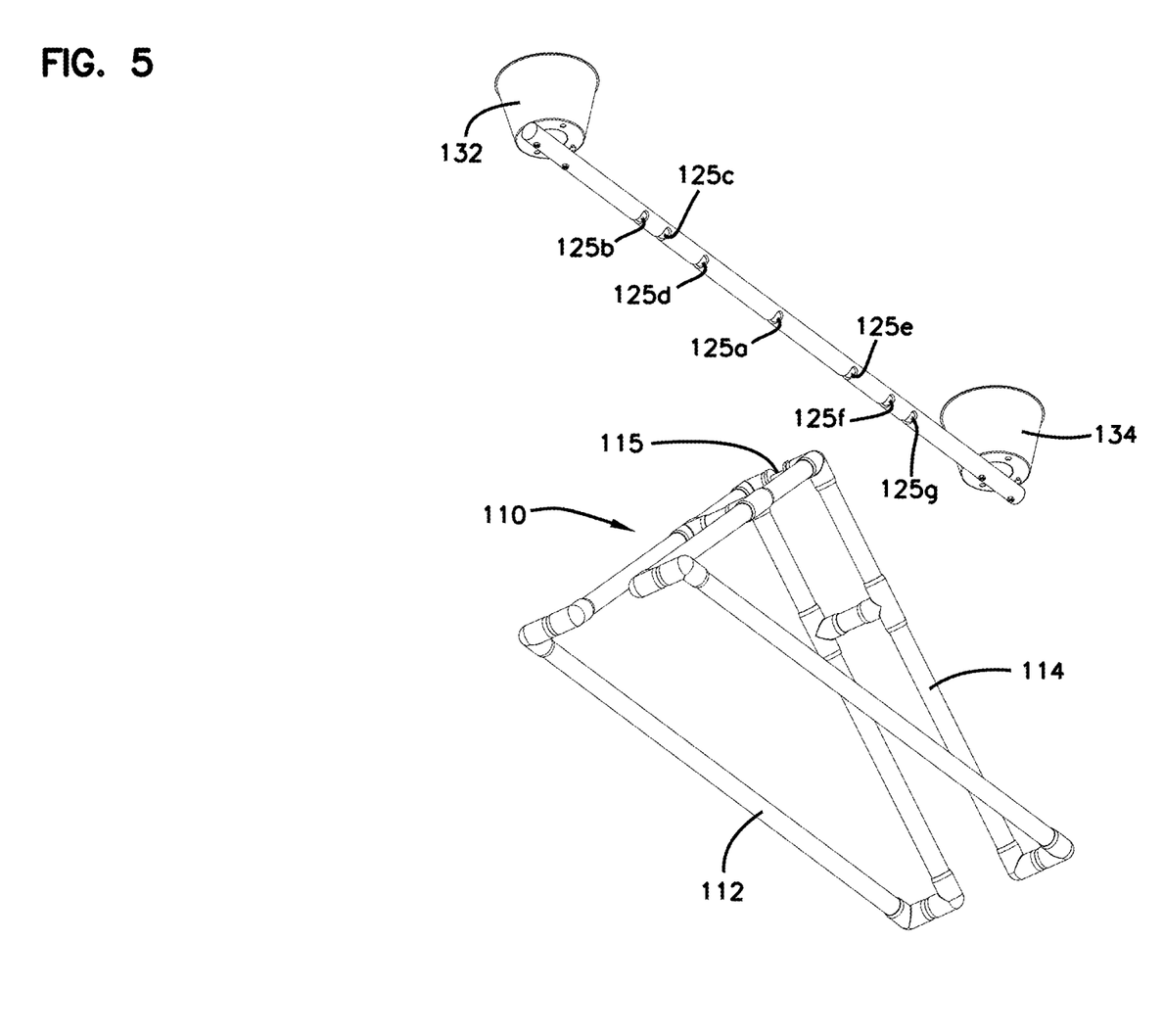
FIG. 5 is a bottom perspective view of the teaching system of FIG. 4 in which the mounting stations of the elongate member are visible.
Figure 6:
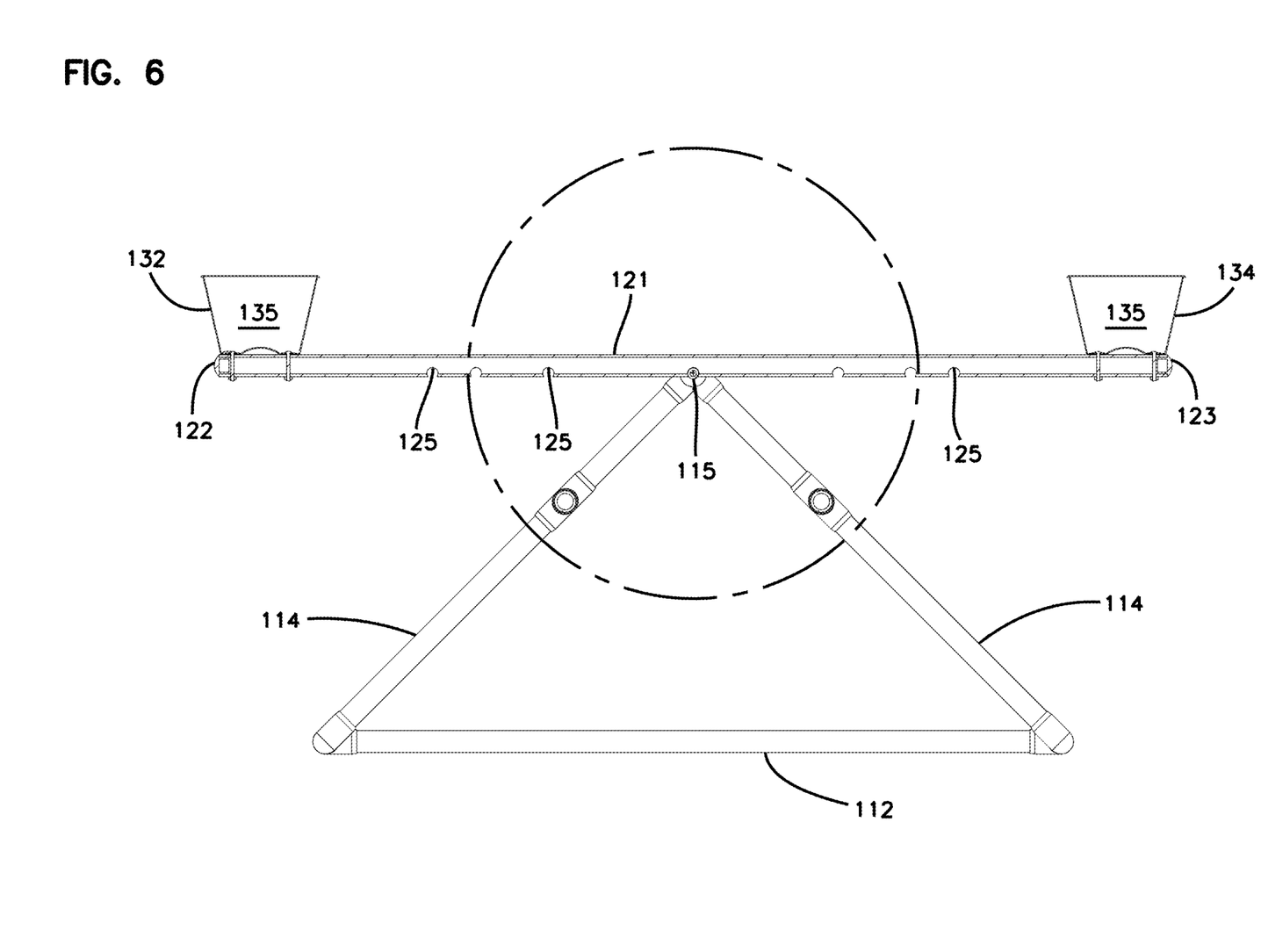
FIG. 6 is a cross-sectional view of the teaching system of FIG. 1.
Figure 7:
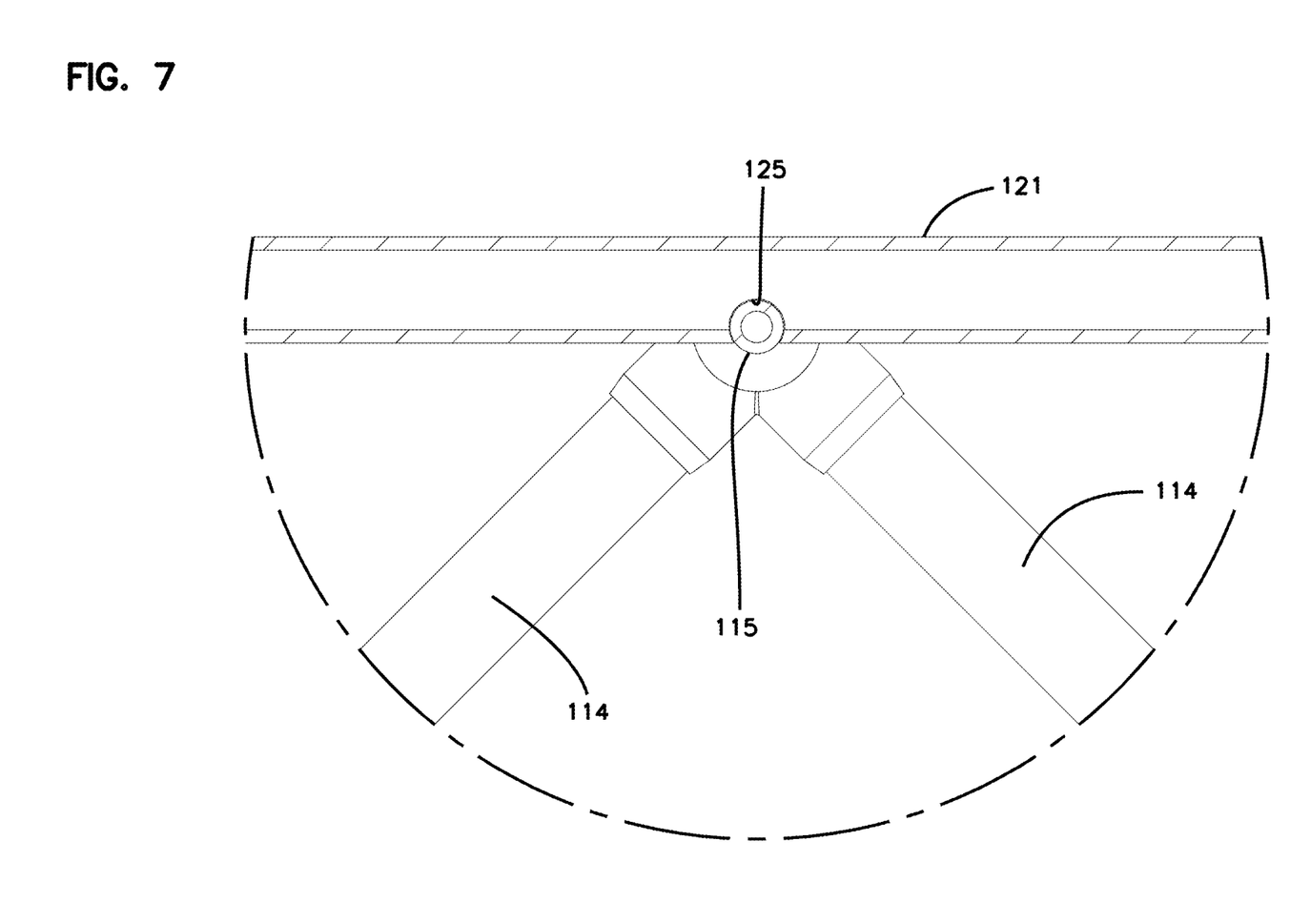
FIG. 7 is an enlarged view of a portion of FIG. 6.

As shown in FIG. 5, the elongate member 120 includes a rod or conduit 121 and the mounting stations 125 include notches defined along the length L of the rod or conduit 121. Each of the notches 125 is sufficiently sized and shaped to accommodate the fulcrum 115. For example, each notch 125 is sufficiently sized and shaped to receive the cross-member forming the fulcrum 115 (see FIG. 7). In certain examples, the notches 125 are sized to snap-fit over the fulcrum 115 when a downward force is applied to the elongate member 120 above the mounting station 125.

In some examples, the notches 125 are hollow. In other examples, the notches 125 may be partially filled with a gripping material (e.g., rubber) or coating. In other examples, the notches 125 may be coated with a lubricant to facilitate pivoting of the elongate member 120 at the fulcrum 115.

In the example shown, the elongate member 120 includes seven mounting stations 125a-125g. In other examples, the elongate member 120 can include any desired number of mounting stations (e.g., one, two, three, four, five, six, eight, nine, ten, etc.). In some examples, the mounting stations 125 are equally spaced along the length of the elongate member 120. In other examples, the mounting stations 125 are unequally spaced along the length of the elongate member 120.

In the example shown, the elongate member 120 includes a central mounting station 125a defined at a central location along the length L of the elongate member 120. In certain examples, the elongate member 120 defines a common number of mounting stations 125 at opposite sides of the central mounting station 125. In the example shown, the elongate member 120 defines three mounting stations to each side of the central mounting station 125. In the example shown, the outer-most mounting stations 125b, 125g are spaced closer to the respective adjacent mounting stations 125c, 125f than the inner mounting stations 125d, 125e are spaced from the central mounting station 125a.

In certain implementations, the elongate member 120 includes one or more repositories 130 at which a load can be added to the elongate member 120. Each repository 130 is sized and shaped to retain one or more incremental loads (e.g., balls, stones, bean bags, or other weights). In certain implementations, the repositories 130 include a peripheral wall 137 extending upwardly from a base 136 (see FIG. 2).

Figure 1:
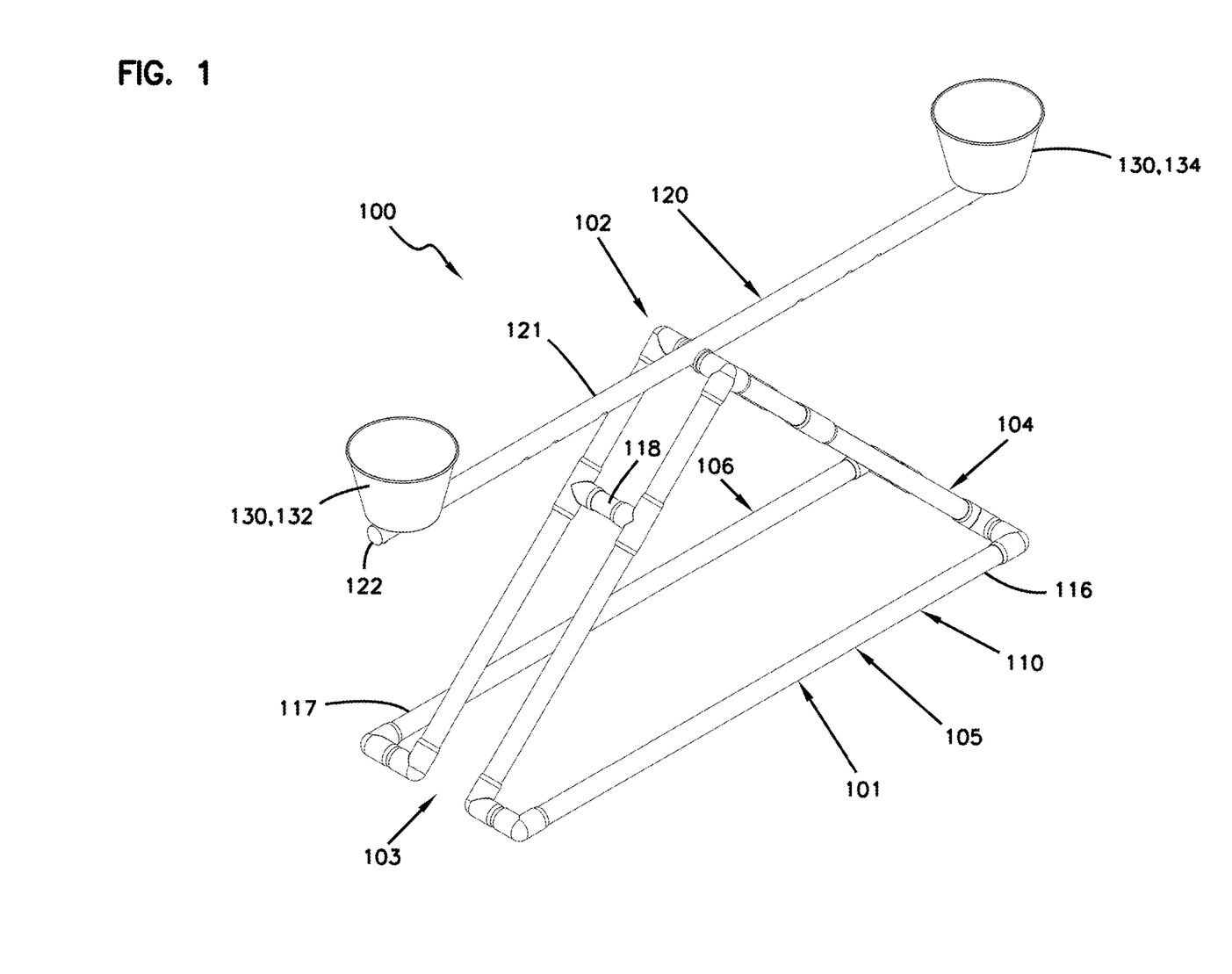
FIG. 1 is a top perspective view of an example teaching system including an elongate member mounted to a frame.
Figure 2:
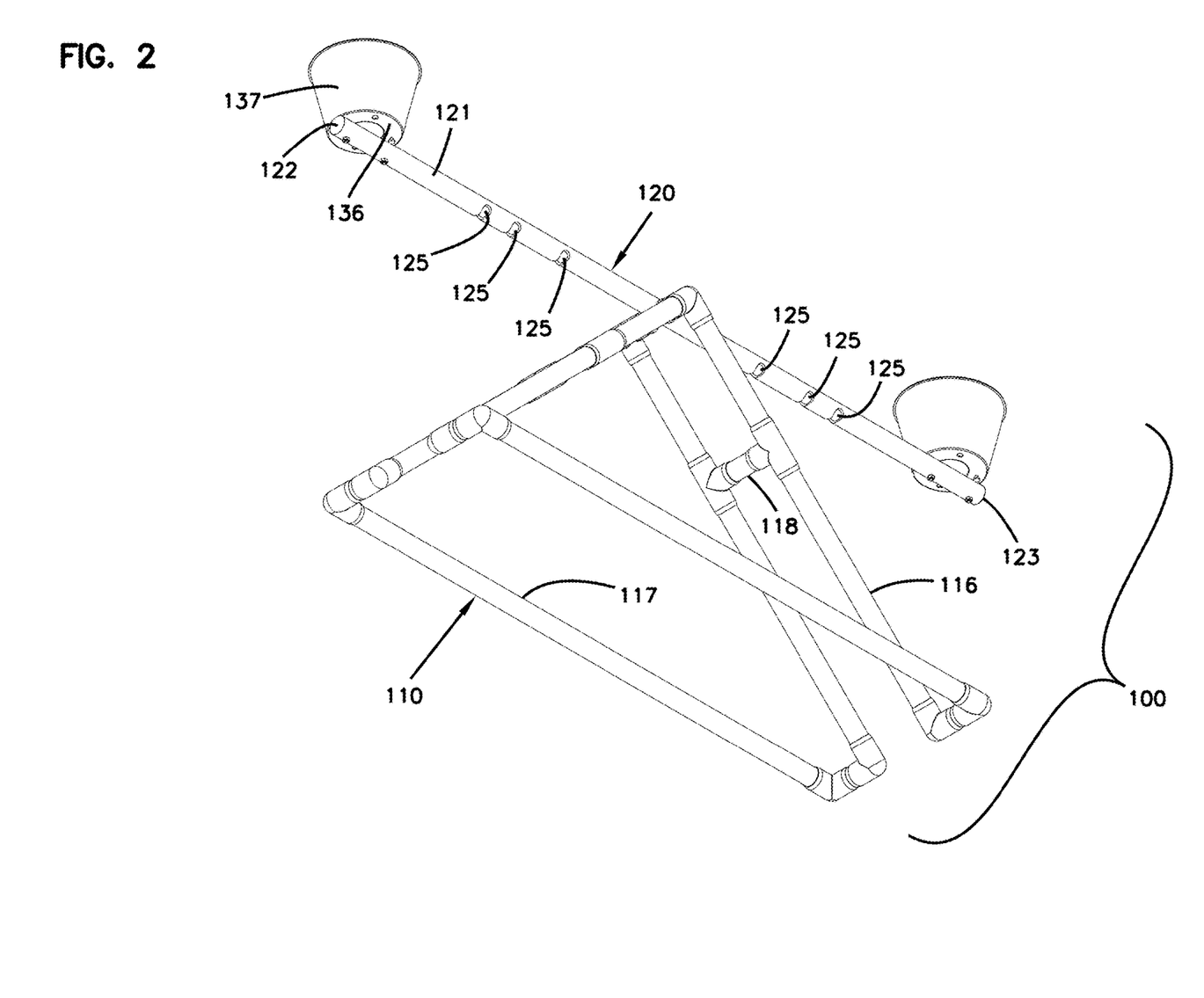
FIG. 2 is a bottom perspective view of the teaching system of FIG. 1.

In the example shown, the repositories 130 are bucket-shaped. In certain examples, the base 136 defines apertures or perforations. In certain examples, the peripheral wall 137 is at least as tall as the base 136 is wide. In certain examples, the peripheral wall 137 is taller than the base 136 is wide. In other examples, however, the repositories 130 can be shallow (i.e., the base 136 is wider than the peripheral wall 137 is tall).

For example, the elongate member 120 may include a first repository 132 at the first end 122 of the elongate member 120. In certain examples, the elongate member 120 also includes a second repository 134 at the second end 123 of the elongate member 120. In some examples, the first and second repositories 132, 134 are disposed at end-most portions of the elongate member 120. In other examples, the first and second repositories 132, 134 are recessed inward from the end-most portions.

In some examples, the repositories 130 are coupled to the elongate member 120 using fasteners. In other examples, the repositories 130 are otherwise coupled to the elongate member 120 (e.g., bolted, welded, glued, snap-fit, friction-fit, monolithically formed, etc.).

In certain examples, the first and second repositories 132, 134 weigh the same empty. In certain examples, the first and second repositories 132, 134 are the same size. In certain examples, the first and second repositories 132, 134 are colored different colors.

Figure 8:
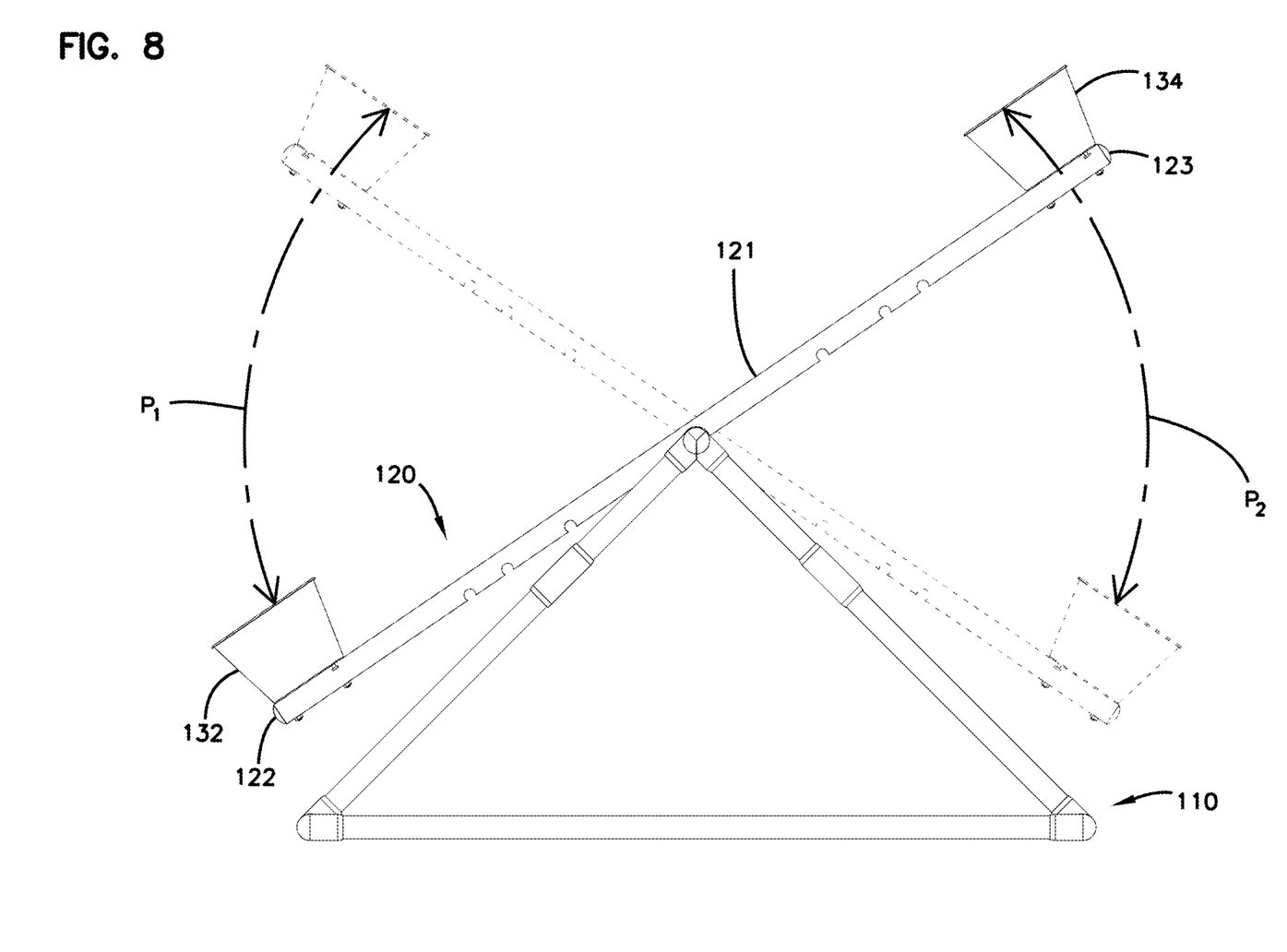
FIG. 8 is a side elevational view of the teaching system of FIG. 1 showing pivot paths for opposite ends of the elongate member.

As shown in FIG. 8, the elongate member 120 is movable (e.g., pivotable or rotatable) relative to the frame 110 when one of the mounting stations 125 of the elongate member 120 is mounted to the fulcrum 115. The first end 122 of the elongate member 120 moves along a pivot path P1 and the second end 123 of the elongate member 120 moves along a pivot path P2 when the elongate member 120.

When the elongate member 120 is mounted to the frame 110 at the central mounting station 125a, the elongate member 120 extends away from the frame 110 towards the first and second ends 122, 123 by equal distances. When the elongate member 120 is mounted to the frame 110 at any of the other mounting stations 125, however, the first end 122 of the elongate member 120 is disposed a different distance from the fulcrum 115 than the second end 123. The end 122, 123 that is closer to the fulcrum 115 has a smaller pivot path than the end 123, 122 that is further from the fulcrum 115.

Figure 9:
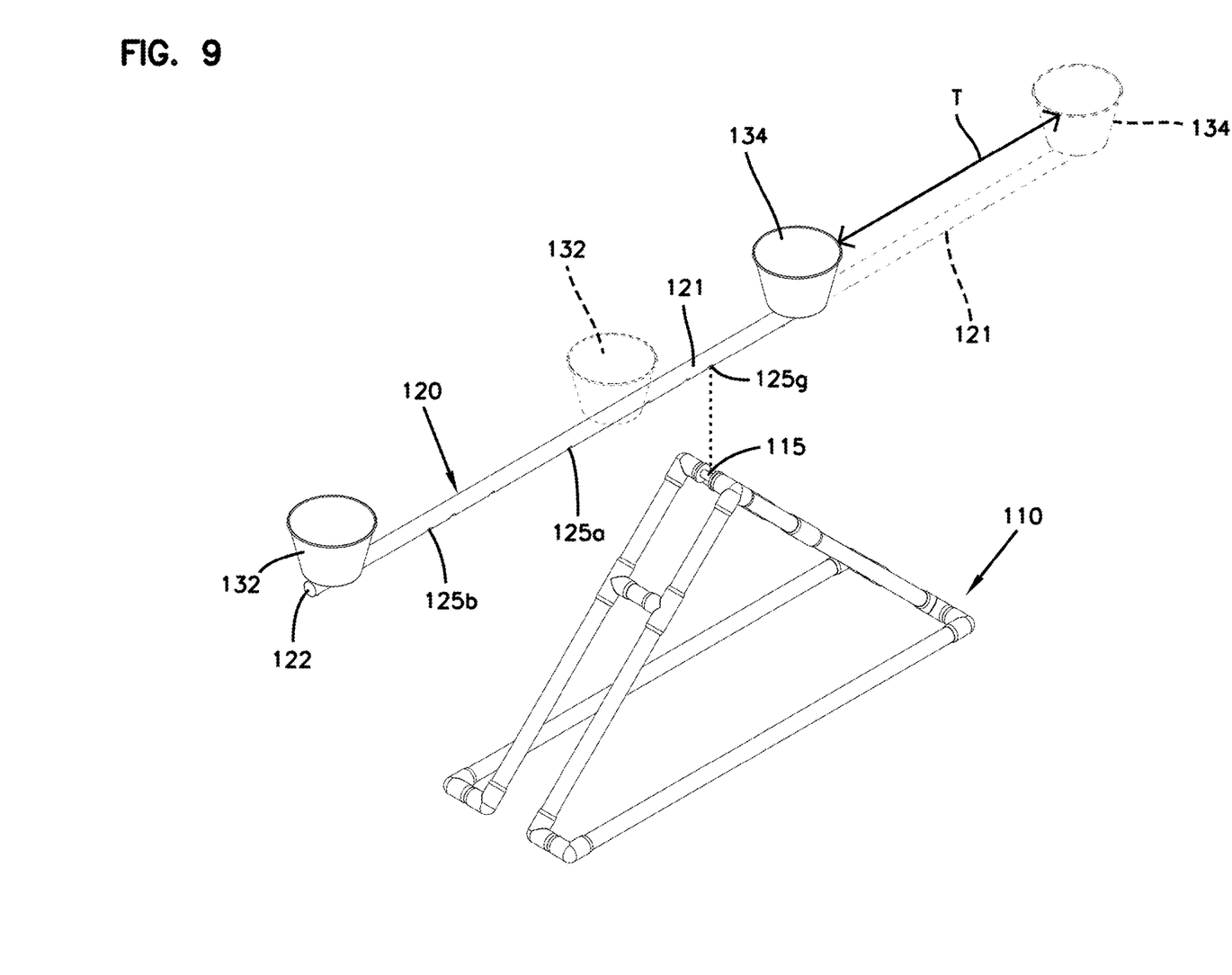
FIG. 9 is a perspective view of the teaching system of FIG. 4 showing a the elongate member positioned relative to the frame at the outermost mounting stations to illustrate a travel distance along which the elongate member can be moved during operation.
Figure 10:
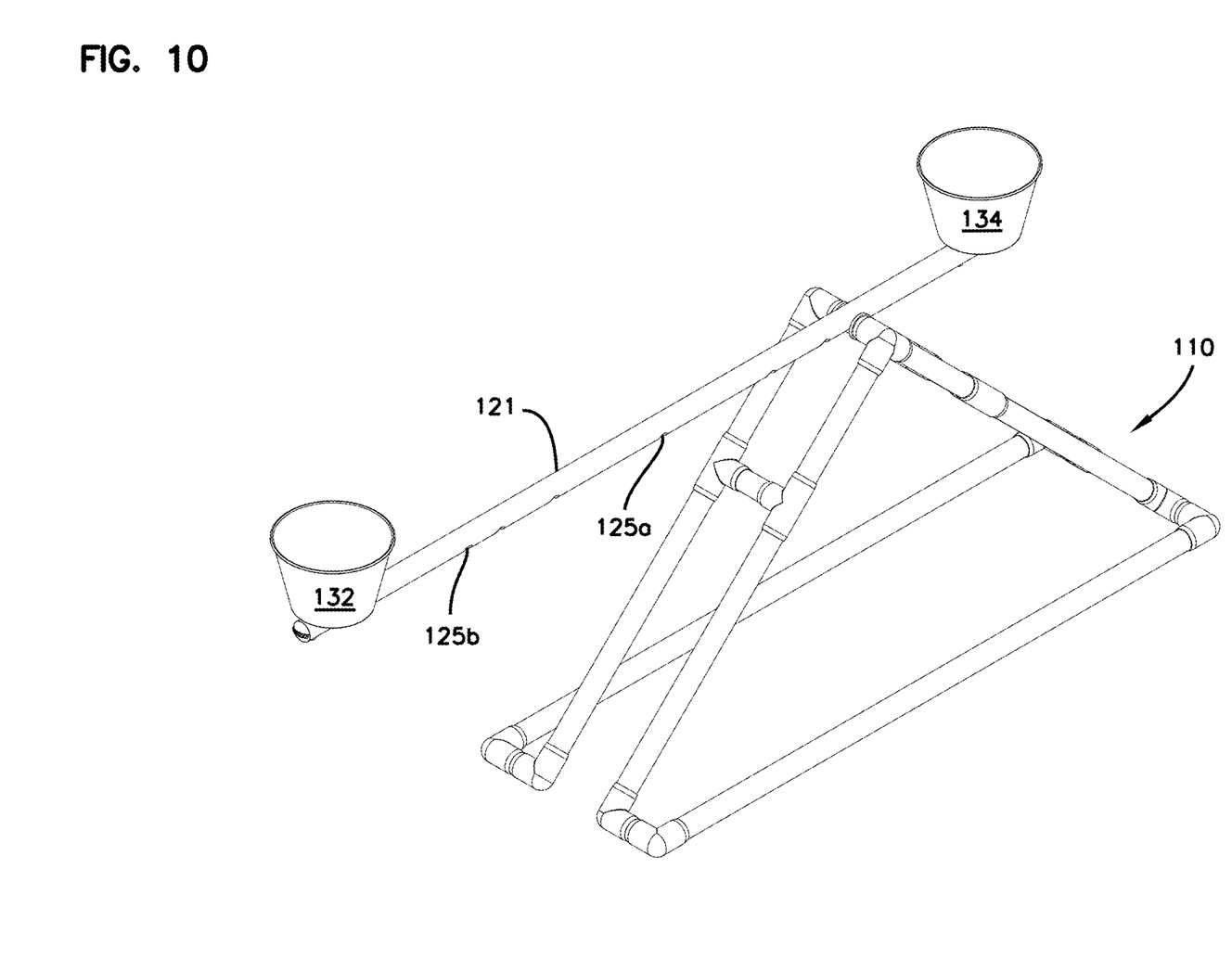
FIG. 10 is a perspective view of the teaching system of FIG. 1 with the elongate member mounted to the frame at one of the outer-most mounting stations.
Figure 11:
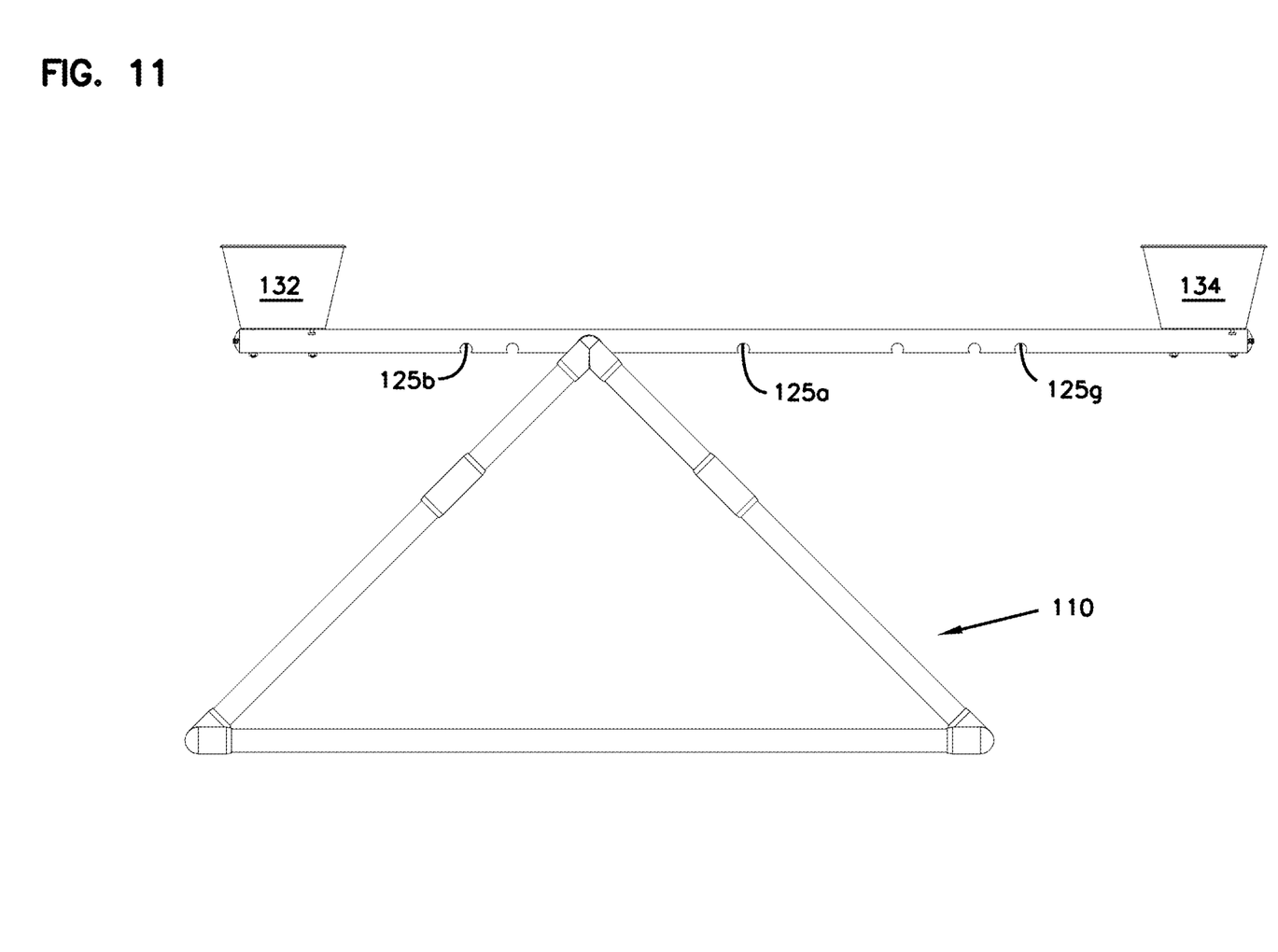
FIG. 11 is a side elevational view of the teaching system of FIG. 1 with the elongate member mounted to the frame at another of the mounting stations.

FIG. 9 illustrates the elongate member 120 in a first position relative to the frame 110. The mounting station 125g closest to the second end 123 is disposed at the fulcrum 115 when the elongate member 120 is disposed in the first position. The elongate member 120 also is shown in dashed lines at a second position relative to the frame 110. The mounting station 125b closest to the first end 122 is disposed at the fulcrum 115 when the elongate member 120 is disposed in the second position. Accordingly, FIG. 9 illustrates a maximum travel distance T along which the repositories 130 can be moved during use of the teaching tool 100.

In use, students select one of the mounting stations 125 and mount the elongate member 120 to the frame 110 at the selected mounting station 125. Students may then attempt to balance the elongate member 120 (e.g., to apply equal loads to both ends 122, 123 of the elongate member 120). For example, the students may apply incremental weights to the repositories 130.

In an example, the students would apply equal weights to the first and second repositories 132, 134 when the central mounting station 125a is coupled to the fulcrum 115. In another example, the students would apply more weight to the first repository 132 than to the second repository 134 if one of the mounting stations 125b-125d disposed between the first end 122 and the central mounting station 125a were selected. In another example, the students would apply more weight to the second repository 134 than to the first repository 132 if one of the mounting stations 125e-125g disposed between the central mounting station 125a and the second end 123 were selected.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A teaching tool comprising:
a frame including a first structure and a second structure coupled together by cross-members, each of the first and second structures including first and second support conduits extending upwardly from a base and towards each other to form a triangular shape, a first of the cross-members defining a fulcrum, the first cross-member coupling to the first structure at a first apex where the respective support conduits of the first structure meet and coupling to the second structure at a second apex where the respective support conduits of the second structure meet, the first cross-member having a smaller cross-dimension than the support conduits;
an elongate member extending along a length between opposite first and second ends, the elongate member defining a plurality of notches disposed along the length, each of the notches defining a predetermined mounting station, each mounting station being configured to selectively snap fit to the fulcrum so that the elongate member rotates relative to the frame about the fulcrum;
a first load repository disposed at the first end of the elongate member, the first load repository including a first peripheral wall extending upwardly from a first base along a first distance to define a hollow interior sized to receive a plurality of incremental loads, the first base extending along a second distance between opposite sides of the first peripheral wall, the first distance being larger than the second distance; and
a second load repository disposed at the second end of the elongate member, the second load repository including a second peripheral wall extending upwardly from a second base along the first distance to define a hollow interior sized to receive a plurality of incremental loads, the second base extending along the second distance between opposite sides of the second peripheral wall.

2. The teaching tool of claim 1, wherein each support conduit includes a generally cylindrical rod.

3. The teaching tool of claim 1, wherein the notches are partially filled with a gripping material or coating.

4. The teaching tool of claim 1, wherein the fulcrum includes a pin defining a rotation axis extending along a length of the pin.

5. The teaching tool of claim 1, wherein the mounting stations are spaced from each other in unequal distances.

6. The teaching tool of claim 1, wherein one of the mounting stations is located at a central location along the length of the elongate member.

7. The teaching tool of claim 6, wherein a number of the mounting stations disposed between the central location and the first end of the elongate member is equal to the number of the mounting stations disposed between the central location and the second end of the elongate member.

8. The teaching tool of claim 6, wherein a portion of the elongate member disposed between the first end and the central location is symmetrical with a portion of the elongate member disposed between the second end and the central location.

9. The teaching tool of claim 1, wherein the first and second repositories include buckets; and wherein distal ends of the buckets are wider than attachment ends of the buckets.

10. The teaching tool of claim 1, wherein the first repository has a first color indicia and the second repository has a second color indicia.

11. The teaching tool of claim 1, wherein the elongate member is sufficiently long to enable the first end of the elongate member to contact a surface on which the frame is disposed when the elongate member is mounted to the frame at a central one of the mounting stations.

12. The teaching tool of claim 1, wherein the first and second repositories are sufficiently sized and shaped to hold a plurality of balls.

13. A method of teaching physics concepts to students using lever system including a frame and an elongate member, the elongate member extending along a length between opposite first and second ends, the elongate member including a first repository at the first end and a second repository at the second end, the method comprising:
selecting one of a plurality of pre-determined mounting stations along the elongate member;
snap-fitting the elongate member to a frame so that the selected mounting station engages a fulcrum of the frame, wherein the first end of the elongate member extends outwardly from the frame in a first direction and the second end of the elongate member extends outwardly from the frame in an opposite second direction when the elongate member is coupled to the frame; and
applying at least one weight to the first repository.

14. The method of claim 13, further comprising applying at least one weight to the second repository.

15. The method of claim 13, wherein the first and second repositories include buckets.

16. The method of claim 13, wherein coupling the elongate member to the frame includes lowering the elongate member onto the fulcrum so that a rotation pin of the frame slides into a notch defined in the elongate member, the fulcrum being defined along the rotation pin.

17. The method of claim 13, further comprising:
removing the elongate member from the frame;
selecting another of the mounting stations; and coupling the elongate member to the frame so that the
selected another mounting station engages the fulcrum
of the frame.

18. The method of claim 17, further comprising applying weights to the first and/or second repositories until the elongate member is balanced.

19. The method of claim 13, wherein the mounting stations are mounted in a row extending along the length of the elongate member.

20. The method of claim 19, wherein the mounting stations are spaced apart unequal distances from each other.

* * * * *